United States Patent [19]
Parker

[11] 3,947,667
[45] Mar. 30, 1976

[54] CIRCUIT FOR DETERMINING TOOL AXIS OFFSET COMPENSATION

[75] Inventor: Peter Robert Parker, Biggleswade, England

[73] Assignee: Cincinnati Milacron Inc., Cincinnati, Ohio

[22] Filed: June 19, 1974

[21] Appl. No.: 480,688

[30] Foreign Application Priority Data
June 25, 1973 United Kingdom............... 30090/73

[52] U.S. Cl............................. 235/151.11; 318/572
[51] Int. Cl.² ........................................ G06F 15/46
[58] Field of Search ...... 235/151.11, 156, 158, 164; 318/571–573

[56] References Cited
UNITED STATES PATENTS

| | | | |
|---|---|---|---|
| 3,479,574 | 11/1969 | Kosem ...................... | 235/151.11 X |
| 3,551,662 | 12/1970 | Price ............................... | 235/158 |
| 3,555,253 | 1/1971 | Seki ............................... | 235/151.11 |
| 3,610,904 | 10/1971 | Kumagai ............................ | 235/158 |
| 3,657,525 | 4/1972 | Evans............................. | 235/151.11 |
| 3,665,499 | 5/1972 | Cutler .............................. | 318/571 |

*Primary Examiner*—Malcolm A. Morrison
*Assistant Examiner*—Jerry Smith
*Attorney, Agent, or Firm*—C. Richard Eby; Jack J. Earl

[57] ABSTRACT

A digital circuit useful in a numerical control system for determining during a preliminary execution of a program the axial components of a tool offset compensation. During a preliminary operation of the program, the sum of the squares of the axial components of displacement of the tool are compared to the square of the desired tool offset. When the sum of the squares equals or exceeds the square of the offset, the current values of the axial components of displacement are stored and used as the axial offset components during a subsequent execution of the program.

1 Claim, 3 Drawing Figures

CIRCUIT FOR DETERMINING TOOL AXIS OFFSET COMPENSATION

BACKGROUND OF THE INVENTION

This invention relates generally to numerical control systems and more particularly to cutter radius compensation circuits therein.

A significant problem in any machining process which requires the use of a machine tool workhead with tool axis offset from the surface to be machined is the determination of the cutter radius compensation which must be programmed into the machine tool. When using, for example, a milling or grinding tool with radius R, the axis of that tool is offset from the line to be machined by that distance R, and programming of the machine tool to machine that line requires programming not only of the line to be machined, but also of the cutter radius compensation which is the X and Y axis components of tool axis offset R. If the line to be machined is parallel to the X or Y axis, the problem is simple; R must be added to or subtracted from the X or Y value defining the line, the sign being determined by the side of the workpiece from which the line is machined.

The situation is not so straightforward if the line lies at an angle $\alpha$ to the X axis where tan $$\alpha = \frac{\Delta Y}{\Delta X}$$

and $\Delta X$ and $\Delta Y$ are the increments of displacement along the X and Y axes involved in tracing the line from a point of origin $(X_1, Y_1)$ along the line to a point $(X_2, Y_2)$. It can be shown, since the radius R of the tool is always at a right angle to the line being machined, that $X^2 + y^2 = R^2$ where $x$ and $y$ are the X axis and Y axis components of the tool radius R. It can also be shown that $$\frac{\Delta Y}{\Delta X} = \frac{x}{y}.$$

and given that relationship, the cutter radius compensation can be determined as $x$ and $y$, and applied to the workpiece coordinates for programming the machine tool.

Such a determination of $x$ and $y$ requires the formation of the square $N^2$ of various numbers N. Multiplying circuits to achieve such a squaring function aqe well-known. Such multiplying circuits are relatively complex, however. The subject invention herein disclosed provided a substantially simpler circuit for forming the square of a number, or the sum of the squares of two or more numbers, for comparing that square or sum of the squares with a known number, and for generating a signal in response thereto.

SUMMARY OF THE INVENTION

The present invention discloses a simplified squaring circuit for forming the square or sum of the squares of one or more increasing numbers, such as displacements in a machining operation. This is accomplished by the use of the derived numerical relationship $$N^2 = \sum_{r=0}^{r=N-1} (2r+1),$$

where N represents the increasing number to be squared. The invention is equipped to perform this function by providing a separate first shift register for each increasing number, each first shift register recirculating and incrementing a first number set (N−1) in response to the incremental increases in that number N. With each recirculation, the contents of the first shift registers are subjected to multiply by two circuits and add one circuits, resulting in a second number set (2r+1) in response to each incremental increase in the number N, where r represents the first number set (N−1). The second number sets (2r+1) are combined and accumulated in a second shift register to form a cumulative sum representing the square or sum of the squares of the one or more increasing numbers. The invention also provides a third register for storage of a constant, and a comparator for comparing the contents of the second shift register with the stored constant, and for generating a signal in response thereto.

The subject invention may also be used to determine the square root of a constant.

DETAILED DESCRIPTION

Figure 2:
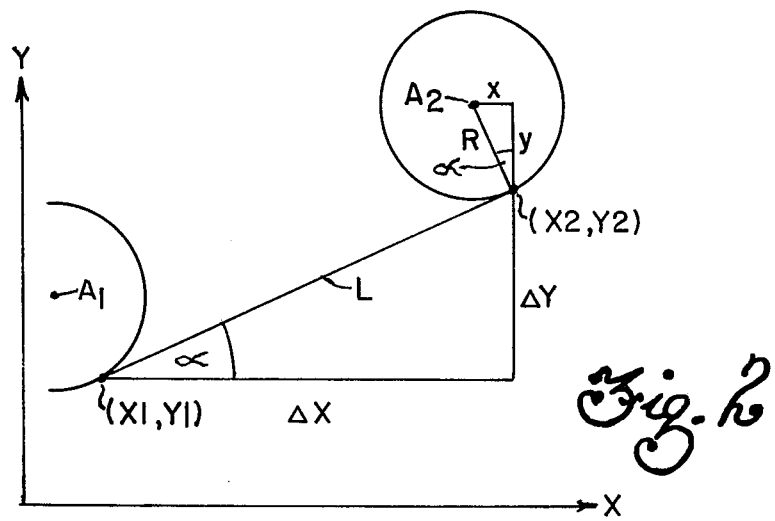
FIG. 2 illustrates the machining path along line L of a circular tool with a tool axis offset R.

There is represented in FIG. 2 a line L to be machined from a point of origin $(X_1, Y_1)$ to $(X_2, Y_2)$ using a tool with an offset R. The tool axis must therefore move from $A_1$ to $A_2$. It will be assumed that the tool axis is at $A_1$ and that it is required to determine the coordinates of $A_2$ in order to correctly program the displacement of the tool. The coordinates of $A_2$ are seen to be $(X_2-x, Y_2+y)$. Assuming the line L lies at an angle $\alpha$ to the X axis, then tan $$\alpha = \frac{\Delta Y}{\Delta X}$$

where $\Delta X$ and $\Delta Y$ are the increments of displacement along the X and Y axes in tracing line L from $(X_1, Y_1)$ to $(X_2, Y_2)$, Since R is at all time perpendicular to the line L, the angle $\alpha$ is created between R and the Y axis, and tan $$\alpha = \frac{x}{y}.$$

As R is known, and the relationship between x and y is established by tan $$\alpha = \frac{x}{y} = \frac{\Delta Y}{\Delta X},$$

it is possible to determine x and y through the use of the Pythagorian theorem $x^2 + y^2 = R^2$.

The numerical control system executes the displacement from the point of origin $(X_1, Y_1)$ to $(X_2, Y_2)$ by supplying simultaneous pulse trains whose rates are proportional to $\Delta X$ and $\Delta Y$ respectively, and whose numbers represent $\Delta X$ and $\Delta Y$ respectively. These same pulse trains can be used to determine $x$ and $y$ in a preliminary cycle of operations in which the pulses are counted to form the numbers $N_x$ and $N_y$, representing the number of pulses along the $X$ and $Y$ axes respectively, being proportional to $\Delta X$ and $\Delta Y$. Therefore, $$\tan \alpha = \frac{\Delta Y}{\Delta X} = \frac{Ny}{Nx},$$

$$\tan \alpha = \frac{Ny}{Nx} = \frac{x}{y},$$

and when $N_x^2 + N_y^2 = R^2$, $N_y = x$ and $N_x = y$.

A relatively simple method for determining the square of any number N may be derived starting from the well-known identity $$\sum_{r=0}^{r=N} r = \frac{N^2 + N}{2}$$

from which $N^2 = \sum_{r=0}^{r=N} 2r - N$.

Now $\sum_{r=0}^{r=N} 2r = \sum_{r=0}^{r=N-1} 2r + 2N$, therefore $N^2 = \sum_{r=0}^{r=N-1} 2r + N$, and $$N^2 = \sum_{r=0}^{r=N-1} (2r+1).$$

The present invention provides a circuit, as will be hereinafter detailed, including separate first shift registers for repeatedly recirculating and incrementing number sets $(N_x-1)$ and $(N_y-1)$ where $N_x$ and $N_y$ represent, in a preliminary cycle of operation, the number of pulses along the $X$ and $Y$ axes respectively that would be encountered in moving from the point of origin $(X_1,Y_1)$ towards $(X_2,Y_2)$. The present invention also includes a second shift register for accumulating and adding together the number sets $(2r+1)$ where $r$ respresents the number sets $(N_x-1)$ and $(N_y-1)$ successively appearing the first shift registers. The resultant cumulative sum in the second shift register is $$\sum_{r=0}^{r=N_x-1} (2r+1) + \sum_{r=0}^{r=N_y-1} (2r+1) = N_x^2 + N_y^2.$$

This resultant is continuously compared with $R^2$ which is held as a known constant in a third register. Since $N_x = y$ and $N_y = x$ when $N_x^2 + N_y^2 = R^2$, the values for $N_x$ and $N_y$ at $N_x^2 + N_y^2 = R^2$ are substituted for $y$ and $x$ respectively to determine the coordinates of $A_2$ which are $(X_2 - x, Y_2 + Y)$ in order to correctly program the tool.

Figure 3:
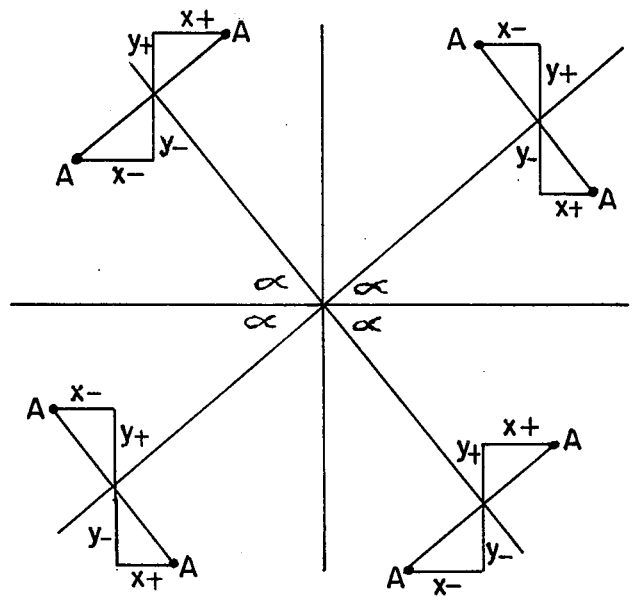
FIG. 3 illustrates the signs to be attributed to the X and Y coordinates of the cutter radius compensation when the workpiece angle $\alpha$ is always considered as an angle to the X axis in the range 0° to 90°.

The question of sign, as is customary in such situations, merely requires the adoption of a convenient logical convention which must take into account the quadrant of operation and the side of line L to which A lies. If $\alpha$ is always treated as an angle to the X axis in the range 0° to 90°, as is shown in FIG. 3, the magnitudes of $x$ and $y$ can be computed as explained above, and then the signs shown in FIG. 3 can be added.

Figure 1:
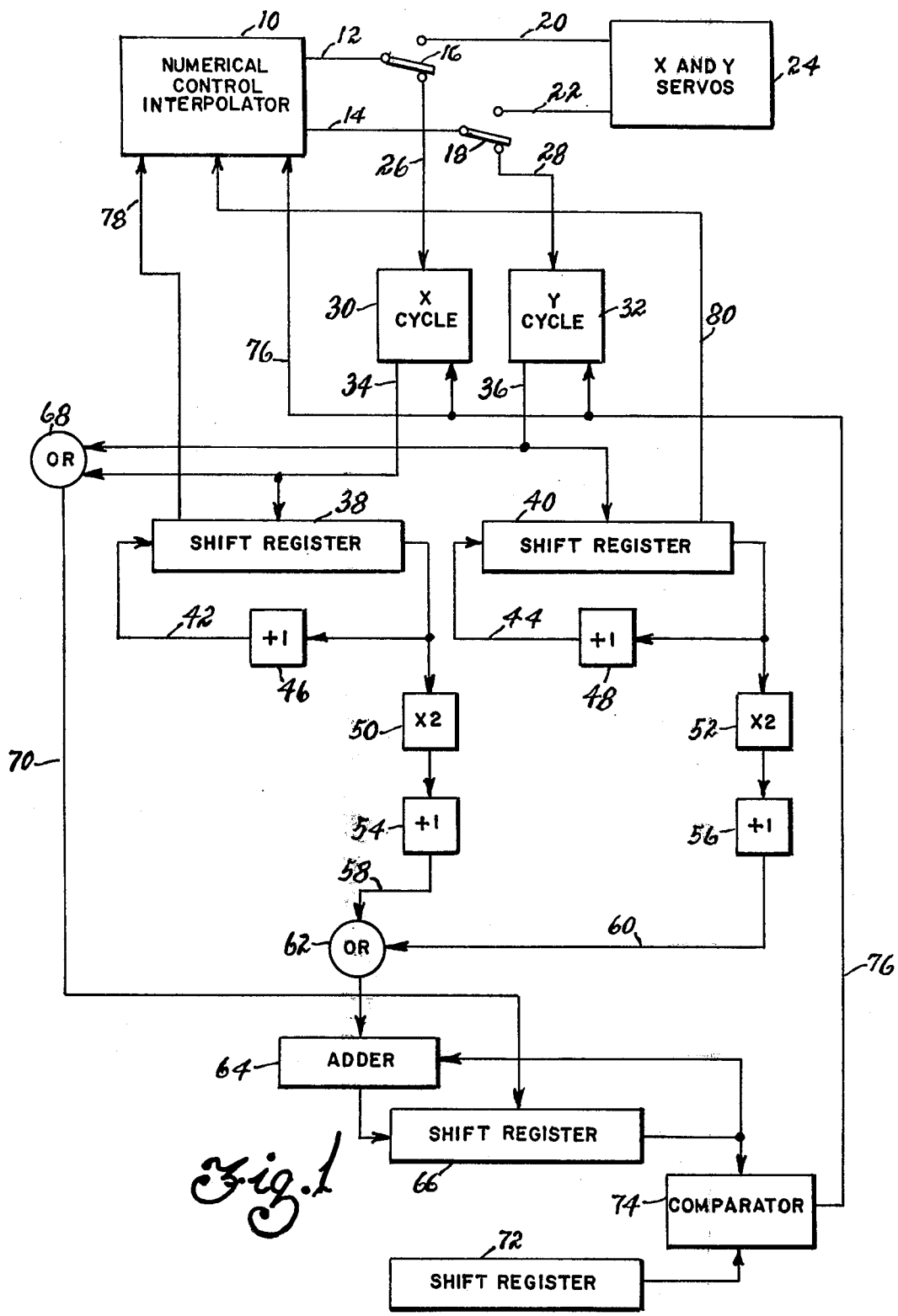
FIG. 1 is a block diagram of the preferred embodiment of the present invention.

A circuit for performing the required operations is shown in FIG. 1. This circuit uses serial techniques although it is obvious that parallel techniques could be employed. The circuit comprises an input pulse generator in the form of a numerical control interpolator 10 which produces $\Delta X$ and $\Delta Y$ pulse trains over circuits 12 and 14, respectively, which can be applied via switches 16 and 18 over circuits 20 and 22 to X and Y servos 24 to control the displacements of the toolhead of a machine tool. During a preliminary cycle of operation, however, the switches 16 and 18 are set in the positions shown to apply the $\Delta X$ and $\Delta Y$ pulses over circuits 26 and 28 to clock signal generators in the form of X cycle and Y cycle circuits 30 and 32. Each of these circuits responds to an input pulse to produce a train of clock signals over circuits 34 or 36 sufficient to cause a complete recirculation of a first shift register 38 or 40, as the case may be. These first shift registers commence with the number zero therein and are connected in recirculating loops 42 and 44 via add one circuits 46 and 48. With each recirculation, the affected first shift register 38 or 40 shifts out its contained number, and is incremented. Therefore, when the x or y cycle circuit 30 or 32 detects an input pulse from the numerical control interpolator 10, and produces a train of clock signals over circuit 34 or 36 to the appropriate first shift register 38 or 40, the number contained within that shift register is a first number set $(N_x - 1)$ or $(N_y-1)$, as the case may be, where $N_x$ and $N_y$ represent the total current number of pulses emitted in the $\Delta X$ and $\Delta Y$ pulse trains by the interpolator 10. Upon receiving the train of clock pulses, the affected first shift register 38 or 40 is recirculated, outputing the first number set $(N_x-1)$ or $(N_y - 1)$ as the case may be, and incremented. After recirculation and incrementation, the first shift registers 38 and 40 contain the numbers $N_x$ and $N_y$, as incrementation renders the affected first shift register current. The first shift registers remain current, then, until the numerical control interpolator 10 issues another input pulse, rendering the number within the first shift register to be recirculated $(N_x-1)$ or $(N_y-1)$ as the case may be.

The first number set outputs $N_x-1$ and $N_y-1$ of the shift registers are applied to multiply by two circuits 50 and 52 and then to add one circuits 54 and 56 whose outputs, equal to a second number set $(2r - 1)$ where $r$ represents the first number sets $(N_x-1)$ and $(N_y-1)$, are carried on circuits 58 and 60, to be combined by a first OR gate 62 and accumulated via an adder 64 in a second register 66 whose contents represent $N_x^2 + N_y^2$. The second register 66 is also a shift register and, to enable the numbers to be added therein, the second shift register 66 is recirculated synchronously with each recirculation of the first shift register 38 or 40. To this end, the shift pulses applied to these registers via circuits 34 and 36 are also applied to the second shift register 66 through a second OR gate 68 via circuit 70. In order that X and Y cycles cannot mask each other, it is arranged that the interpolator 10 interleaves X and Y pulses in such a manner that when any such pulse appears, sufficient time is left for completion of the X or Y cycle before any further pulse appears.

The value of $R^2$ is preset in a third register 72 and the contents of the two registers 66 and 72 are compared by a comparator 74 which produces a stop pulse on circuit 76 when $N_x^2 + N_y^2 \geq R^2$. The stop pulse prevents the X and Y cycle circuits 30 and 32 from effecting any further recirculations of the first shift registers 38 and 40 and also causes the interpolator 10 to accept the values $N_x$ and $N_y$ then held in the first shift registers 38 and 40 via circuits 78 and 80 and o apply these as corrections y and x respectively to the programmed $Y_2$ and $X_2$ coordinates.

The trains of pulses $\Delta X$ and $\Delta Y$ are then re-emitted with the switches 16 and 18 changed over, whereby the servos 24 move the cutting point of the tool along the line L from the point of origin $(X_1,Y_1)$ to the point $(X_2,Y_2)$, by moving the tool axis along the parallel line from $A_1$ to $A_2$(FIG. 2).

It should be pointed out that the subject invention can also be used to determine the square root R of a known value $R^2$. If N is the increasing number of input pulses from the interpolator 10, then clock cycles from the X cycle circuit 30 in response to the input pulses on circuit 26 cause recirculation and incrementation of the first number set, (N−1), contained in the first shift register 38 via the circulating loop 42 which contains add one circuit 46. In response to each recirculation and incrementation of the first number set (N−1) a second number set (2r+1) is produced in multiply-by-two circuit 50 and add one circuit 54, where r represents the first number set (N−1). The second number sets (2r+1) are accumulated via adder 64 in the second shift register 66 whose contents represent $N^2$. The constant $R^2$ is preset in the third shift register 72 and the contents of the two registers 66 and 72 are compared by the comparator 74 which produces a stop pulse on circuit 76 when $N^2 \geq R^2$. The stop pulse prevents the X cycle circuit 30 from affecting any further recirculations of the first shift register 38, and also causes the interpolator 10 to accept the value N then held in the first shift register 38 as the square root R of the known value $R^2$.

What is claimed is:

1. An apparatus for use with a numerical control having a pulse generator for generating trains of X and Y pulses having rates proportional to displacement along respective X and Y axes of motion, said apparatus being operative during a preliminary execution of a program to produce X and Y tool offset signals representing component values along each axis of motion for a desired tool radius offset, the apparatus comprising:
   a. cycle control means responsive to the trains of X and Y pulses for producing trains of X and Y clock signals, respectively;
   b. X and Y register and one-bit adder loops responsive to corresponding X and Y clock signals for incrementing by one X and Y first signals contained in the registers in response to the clock pulses, said X first signal having a magnitude proportional to the number of X pulses and representing the Y tool offset signal and said Y first signal having a magnitude proportional to the number of Y pulses and representing the X tool offset signal;
   c. X and Y multiplier means responsive to the X and Y first signals respectively for multiplying the first signals by two to oroduce X and Y product signals;
   d. X and Y one-bit adder means responsive to the multiplying means for adding one to the X and Y product signals to produce X and Y second signals representing the square of the X and Y first signals respectively;
   e. adder and storage means responsive to the onebit adder means for summing the X and Y second signals;
   f. a storage register for storing a reference signal representing the square of the desired tool radius offset; and
   g. a comparator circuit having inputs responsive to the adder and storage means and outputs connected to the cycle control and the pulse generator for producing a stop signal in response to the sum of the second signals being equal to or greater than the reference signal, said stop signal terminating the operation of the cycle control means and the pulse generator whereby the magnitude of the X and Y first signals at the time of occurrence of the stop signals represents the magnitude of the Y and X tool offset signals respectively.

* * * * *